United States Patent [19]

Smith

[11] Patent Number: 5,267,584
[45] Date of Patent: Dec. 7, 1993

[54] METHOD OF FLUID FLOW CONTROL USING A POROUS MEDIA

[76] Inventor: Richard D. Smith, 11810 Holmes Pt., Dr., NE., Kirkland, Wash. 98034

[21] Appl. No.: 769,698

[22] Filed: Oct. 2, 1991

Related U.S. Application Data

[62] Division of Ser. No. 598,457, Oct. 16, 1990.

[51] Int. Cl.$^5$ .............................................. F17D 1/16
[52] U.S. Cl. ..................................... 137/13; 137/828; 60/203.1
[58] Field of Search ................. 137/13, 828; 60/203.1, 60/204

[56] References Cited

U.S. PATENT DOCUMENTS

| | | | |
|---|---|---|---|
| 3,612,084 | 10/1971 | Kassel | 137/13 |
| 3,688,083 | 8/1972 | Rice et al. | 219/381 |
| 3,781,518 | 12/1973 | Power et al. | 219/271 |
| 3,906,978 | 9/1975 | Kurz | 137/78.3 |
| 3,943,330 | 3/1976 | Pollack et al. | 219/381 |
| 4,254,800 | 3/1981 | Masaki | 137/13 |

*Primary Examiner*—Richard A. Bertsch
*Assistant Examiner*—Howard R. Richman

[57] ABSTRACT

An apparatus for use in space environments to control the flow of a propellant to a thruster at a low mass flow rate comprises an insulated body having a cavity therein defining a vaporizing chamber, a porous medium having a low liquid permeability disposed in the chamber, a conduit means for feeding a propellant liquid into the chamber and exhausting a propellant vapor from the vaporizing chamber, and a heating means communicating with the medium within the chamber for controllable heating of the liquid propellant in the chamber creating a variable liquid/vapor transition zone within the medium. The transition zone is responsive to the heating means to control the mass flow rate of propellant through the vaporizing chamber. As the liquid/vapor transition zone is moved upstream by increasing the heater output, and thus increasing the volume of vapor within the porous medium, mass flow through the porous medium is decreased. Conversely, movement of the liquid/vapor transition zone downstream through the medium by decreasing the heater output, and thus exposing more of the porous medium volume to liquid, increases the mass flow rate.

3 Claims, 4 Drawing Sheets

METHOD OF FLUID FLOW CONTROL USING A POROUS MEDIA

This application is a division of pending application Ser. No. 07/598,457, filed Oct. 12, 1990.

BACKGROUND OF THE INVENTION

This invention generally relates to flow control mechanisms and more specifically to a fluid flow control apparatus preferably for use in space to control the flow of propellant to an electrothermal thruster.

Electrothermal thrusters, such as arcjets or resistojets, are utilized in space applications for attitude control and station keeping of satellites. These thrusters generally use a gaseous or vapor propellant feed. Storage of propellants as liquids rather than as gases is more attractive for technical and economic reasons. "Storable" liquid propellants, such as water or ammonia, must therefore be vaporized on orbit prior to use in a cold gas or electric thruster.

Vaporization of a storable liquid propellant for electric propulsion devices in the zero gravity environment of space is complicated by the following:

1. Maintenance of good thermal contact between the liquid and the heating surfaces is not aided by gravity. Suitable heat transfer coefficients are therefore difficult to achieve.
2. Unstable or oscillatory flow can occur due to improper feedstream impedance. This problem is characteristic of the once through boilers (vaporizers) typical of space applications.
3. Variable control of flow rate, i.e. throttling, if desired, is very difficult for the low flow rates typical of electric thrusters used for attitude control and station keeping such as resistojets and arcjets. For typical mass flow rates of less than 1 lbm/hr, liquid volumetric flow rates are so low that control valve resolution is inadequate. Vapor phase volumetric flow rates are higher, to be sure, but hot-gas flow control valves are subject to material compatibility and reliability problems which are not compatible with the high reliability and long life requirements of space applications.

SUMMARY OF THE INVENTION

The invention disclosed herein addresses the problem of providing a variable control of mass flow rate at the very low rates required of electric thrusters, i.e. less than about one or two pounds mass per hour (lbm/hr). The apparatus in accordance with the present invention addresses primarily problem 3 above and in so doing facilitates a solution of problems 1 and 2 in one integral device. The apparatus is particularly adapted to provide variable control of mass flow to an arcjet thruster. In so doing, the apparatus in accordance with the present invention permits the maintenance of good thermal contact between the propellant liquid and the source of heat causing vaporization of the liquid propellant. In addition, the present invention minimizes oscillatory flow due to improper feedstream impedance.

The method of propellant flow control in accordance with the present invention, simply stated, comprises the steps of:

(1) Providing a storable liquid propellant in a storage container;
(2) Providing a flow path for the liquid propellant from the storage container containing the propellant to an electric thruster;
(3) Interposing a porous medium in the flow path which has a low liquid permeability (as defined by Darcy's Law) so as to effectively restrict or limit the flow of the liquid propellant through the medium; and
(4) Controllably heating the medium to controllably vaporize at least a portion of the liquid propellant in the medium creating a back pressure in the medium to thereby control the rate of propellant fluid flow to the electric thruster.

The apparatus necessary to carry out the method of the present invention includes an insulated body of an appropriate shape such as a cylindrical canister shaped housing having a cavity therein which defines a vaporizing chamber, a conduit means such as tubing for feeding a propellant liquid at propulsion system feed pressure from a storage container into the housing and thus into the vaporizing chamber and then exhausting the propellant vapor from the chamber, a porous medium disposed in the chamber and positioned so as to block free flow of propellant through the chamber, and a heating means such as a resistance heater positioned within the housing and communicating with the medium for controllably heating the liquid propellant in the medium in the vaporizing chamber.

The porous medium has a very low porosity and liquid permeability so as to limit the maximum mass flow rate through the medium to less than about 2 lbm/hr. The vapor permeability of such a material is correspondingly much lower. A ceramic material such as alumina is an example of a porous material for the vaporizing medium. The thermal energy from the resistance heater raises the temperature of the liquid propellant in the porous medium to establish a variable liquid/vapor transition zone within the medium. This transition zone is responsive to the amount of heat transmitted from the heater. The position of the transition zone, i.e. its spacing from the heater, varies directly with the temperature within the porous medium and thus the heat input from the heater. In addition, the zone position determines the overall flow impedance of the vaporizing chamber. If the transition zone is near the inlet of the medium, furthest from the heat source, a "vapor lock" is created which reduces the mass flow of propellant to near zero. If the transition zone is at or near the outlet of the medium, nearest to the heat source, flow of propellant through the medium is maximum.

One preferred embodiment of the present invention includes a cylindrical canister having an outer wall and at least two concentrically spaced annular inner walls which define a vaporizing chamber therebetween. Disposed between the inner walls is a porous medium having a very low porosity and very low permeability. The medium may be a self supporting solid or may require an external support structure such as the walls to hold it together. If the porous medium is a structurally solid body and preferably in the shape of a tube, these annular inner walls may be eliminated. If the inner walls are present, the inner walls will have apertures therethrough for passage of the propellant into and out of the vaporizing chamber.

A liquid propellant from a conventional pressurized propellant supply is fed via tubing through the outer canister wall into the annular space between the outer inner wall and the outer wall. The propellant can then pass through the apertures in the outer inner wall into the vaporizing chamber and the porous medium. The propellant passes out of the vaporizing chamber through the apertures in the inner wall into a central axial passage and then out of the canister through another conduit or tube which then directs the vaporized propellant to the thruster.

The porous medium is selected from materials that have a low liquid permeability and must have a permeability that is effective to limit passage of liquid propellant therethrough. Due to the small pore sizes, surface forces will promote good contact between the heating surfaces of the porous medium and the liquid propellant so that the solid/liquid heat transfer coefficient is high.

Centrally disposed along the axis of the canister in this embodiment is a heating element such as a cylindrical resistance heating element. This heating element may also have radial ribs to conduct heat from the heating element to the inner wall of the vaporizing chamber. Heat is also transferred by convection and radiation from the resistance heater across the inner wall to the medium in the vaporizing chamber.

The liquid/vapor transition zone referred to above is created first near the inside surface of the medium as the current to the resistance heater is increased. As additional heat flux is supplied to the medium, this transition zone moves radially outward, vaporizing more of the liquid propellant within the medium and creating a resistance or more precisely a back pressure against the flow of the liquid propellant through the medium. Eventually, when the zone approaches the outer margin of the medium, the back pressure creates a "vapor lock" condition which effectively terminates flow through the medium. Conversely, as the temperature of the heating element and thus the temperature gradient across the porous medium decreases, the transition zone moves radially inward thus increasing the mass flow rate of liquid propellant and vapor through the medium in the vaporizing chamber and thus through the canister.

In other words, the liquid/vapor transition zone within the porous medium is responsive to the amount of heat added by the resistance heating element. The location of this transition zone will be determined by an overall energy balance on the porous medium itself. Generally speaking, energy enters the porous medium as conducted and radiated energy from the heater or as sensible heat of the incoming fluid, and exits either as sensible or latent heat in the vapor, or as radiated and conducted heat losses from the outer walls of the device. The position and extent of the transition zone effectively controls the mass flow rate of propellant through the vaporizing chamber. This method of propellant flow control is particularly well adapted to the low flow rates required for proper operation of low thrust arcjet thrusters and resistojets in the space environments where the effects of gravity are minimal or nonexistent.

The porous medium in the apparatus in accordance with the present invention provides good contact between the heating surface (the porous medium itself) and the propellant liquid being vaporized. It has very small pores and therefore a large surface area for fluid contact. The solid/liquid heat transfer coefficient is therefore quite high. In a low porosity material chosen to give the appropriate solid/liquid interfacial tension, surface forces dominate and promote intimate solid/liquid contact, thus ensuring efficient heat transfer.

The apparatus of the invention may also act simply as a flow restrictor. Flow restrictors or fluid resistors of some kind are typically installed upstream of small electrical and chemical thrusters in space applications to promote stable fluid dynamic operation. The apparatus in accordance with the present invention also provides the necessary high impedance to liquid flow and so may also be used for this purpose in addition to use as a vaporizer.

The apparatus in accordance with the present invention can also be designed such that a portion of the medium, preferably an annular porous ring, is always upstream of the liquid/vapor transition. The liquid permeability of this region may also be specified to be low enough that the pressure drop across it will be quite high. This outermost portion of the porous medium can thus serve as an intrinsic fluid resistor. In conjunction, a second, inner, porous ring, having a higher vapor permeability, can afford finer flow rate control if the vapor/liquid transition zone is kept within this inner ring.

In another embodiment of the invention, multiple heaters may be embedded in the porous medium to selectively vaporize portions of the liquid in the medium. In this way a variable resistance flow restrictor may be created with or without the exiting fluid being a vapor.

Other features and advantages of the present invention will become apparent from a reading of the following detailed description when taken in conjuction with the appended claims and the accompanying drawing. In the several embodiments shown in the figures of the drawing, like numbers are used to describe like components and to simplify the description.

DETAILED DESCRIPTION OF THE PREFERRED EMBODIMENTS

Figure 1:
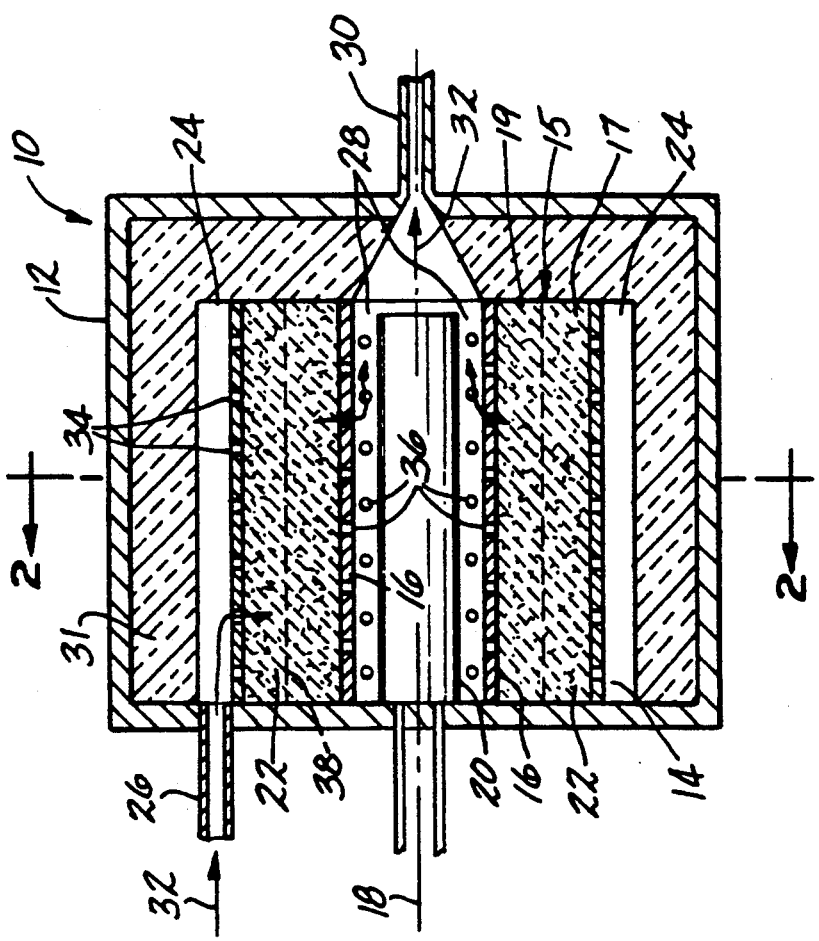
FIG. 1 is a longitudinal sectional view through a first preferred embodiment of the present invention.

A first preferred embodiment of the propellant vaporizing apparatus in accordance with the present invention is illustrated in FIG. 1. The propellant vaporizing apparatus 10 is preferably a cylindrical canister body having an outer wall 12, a concentric intermediate wall 14, and a coaxial concentric inner wall 16 defining an annular vaporizing chamber 15 therebetween coaxial with a central axis 18. A resistive heater 20 is centrally disposed along axis 18 inside and spaced from inner inner wall 16. The power to the heater 20 could be variably controlled by any conventional means.

A ring shaped porous medium 22 effectively divides chamber 15 into two portions, an inlet portion 17 and an outlet portion 19. As shown in FIG. 1, the medium 22 preferably fills both portions of the vaporizing chamber 15 and is retained between the intermediate wall 14 and the inner wall 16.

Alternatively, if the porous medium is a structurally self supporting solid body, walls 14 and 16 may be eliminated as in the other embodiments described below. In such cases, the support function of the walls would be performed by the porous medium 22 itself.

Annularly enclosing the intermediate wall 14 is an annular liquid feed channel 24 which communicates with a propellant inlet tubing 26. The inner wall 16 surrounds and defines a central axial vapor header 28 which communicates with an exhaust tube 30 which is in turn connected to any conventional electrothermal thruster such as an arcjet or resistojet (not shown). Finally, interposed between the liquid propellant channel 24 and outer wall 12 may be a layer of insulation 31 to insulate the vaporizing apparatus 10 from the outside space environment.

In operation, a liquid propellant such as water or ammonia is fed in direction 32 under pressure via the tubing 26 into the annular channel 24 and through apertures 34 and into the porous medium 22. The porous medium 22 is preferably a material such as alumina (aluminum oxide) has a low porosity and thus a low liquid permeability. The propellant then permeates, as liquid, into the porous medium 22, is vaporized therein, and exits as vapor through apertures 36 in inner wall 16 into the vapor header 28. The propellant vapor then exhausts through the propellant vapor exhaust tubing 30.

The maximum propellant mass flow rate through the apparatus 10, less than about 2 lbm/hr, is obtained when the liquid/vapor transition occurs at the inner surface of the porous annular ring, i.e. when there is pure liquid flowing through the porous medium 22. If no current is supplied to the heater 20, pure liquid flows out the exhaust tube 30 and the vaporizer acts simply as a flow restrictor with its flow resistance determined by the porosity of the medium 22.

Normally, current is supplied to the heater 20 to vaporize the propellant at least in vapor header 28. The propellant liquid which passes through medium 22 is vaporized as it enters through apertures 36 into the vapor header 28 by the heater 20. At this point flow through the vaporizing apparatus 10 is maximum or very near maximum. As the power supplied to heater 20 is further increased, a annular liquid/vapor transition zone 38 is established within the porous medium 22. Still further heat addition causes this transition zone 38 to move radially outward. The position of this transition zone is determined by an overall heat balance on the vaporizing apparatus 10. The use of this type of flow control in accordance with the invention will permit obtaining an accuracy of control within about ±0.01 lbm/hr.

As the permeability of the porous medium 22 is much lower for the propellant vapor, propellant flow through the porous medium may be closely controlled by the radial position of the liquid/vapor transition zone 38 and thus by the power supplied to the heater. As noted above, the mass flow rate is maximum when the transition zone is located adjacent the inner wall 16. The propellant flow is minimum, effectively negligible, when the liquid/vapor transition zone is adjacent the intermediate wall 14.

The overall liquid permeability of the porous medium 22, which preferably has an annular cylindrical ring shape, is a function of its specific liquid permeability, thickness, inner and outer radii, and length, and therefore will be determined by the 100 percent flow rate design point specified for the device. The position of the liquid/vapor transition zone will be determined by a complex interaction of the radial thermal and pressure gradients within the porous ring. In general, the fluid pressure will decrease with decreasing radius within the ring while the temperature generated in the medium 22 by the heater 20 will increase with decreasing radius. Ideally, vaporization will then occur at that radius within the ring for which the vapor pressure of the liquid is equal to the fluid pressure. The vapor pressure of the liquid may be appreciably affected by the radius of curvature in this embodiment of the vapor/liquid interface due to the small pore sizes of the porous material.

As the heater power is increased, the liquid/vapor transition zone 38 within the medium 22 will move to a larger steady state radius, and the mass flow rate for the device will decrease. As the heater power is increased, the specific enthalpy of the exit stream will also increase. Since substantial additional superheat will be added in any case downstream of the vaporizer in any electrothermal propulsion application, this increased superheat would not be lost.

Figure 2:
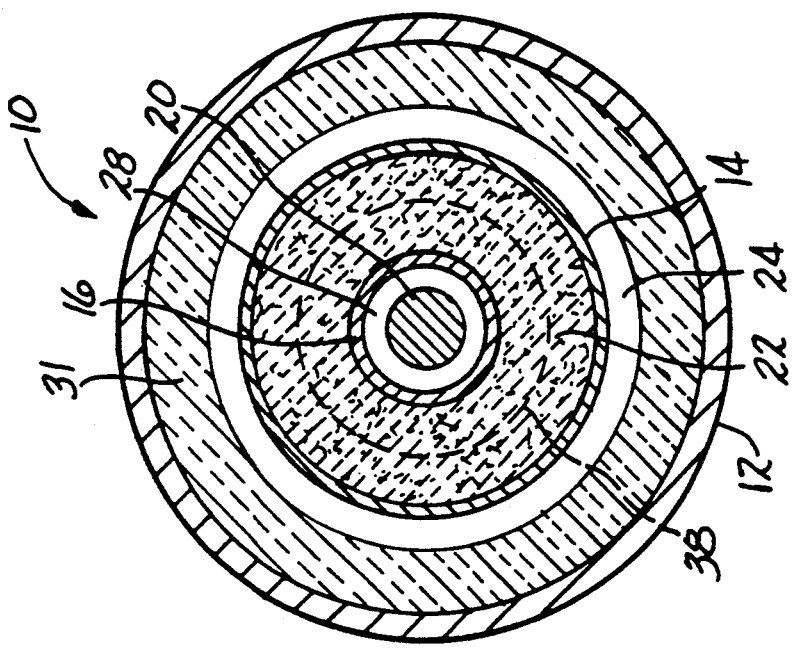
FIG. 2 is sectional view taken on the line 2—2 in FIG. 1.

The basic concept of controlling the flow through the propellant vaporizer by varying the location of the liquid/vapor transition zone is not limited to the configuration shown in FIGS. 1 and 2. Flow control is accomplished because, for a given pressure drop, the vapor phase mass flow rate through a given flow restriction will be much lower than the liquid phase mass flow rate through the same restriction. Accordingly, other physical configurations and embodiments of the basic concept of the vaporizer flow control apparatus are possible and are envisioned within the scope of the present invention, including, but not limited to the following variations.

Figure 4:
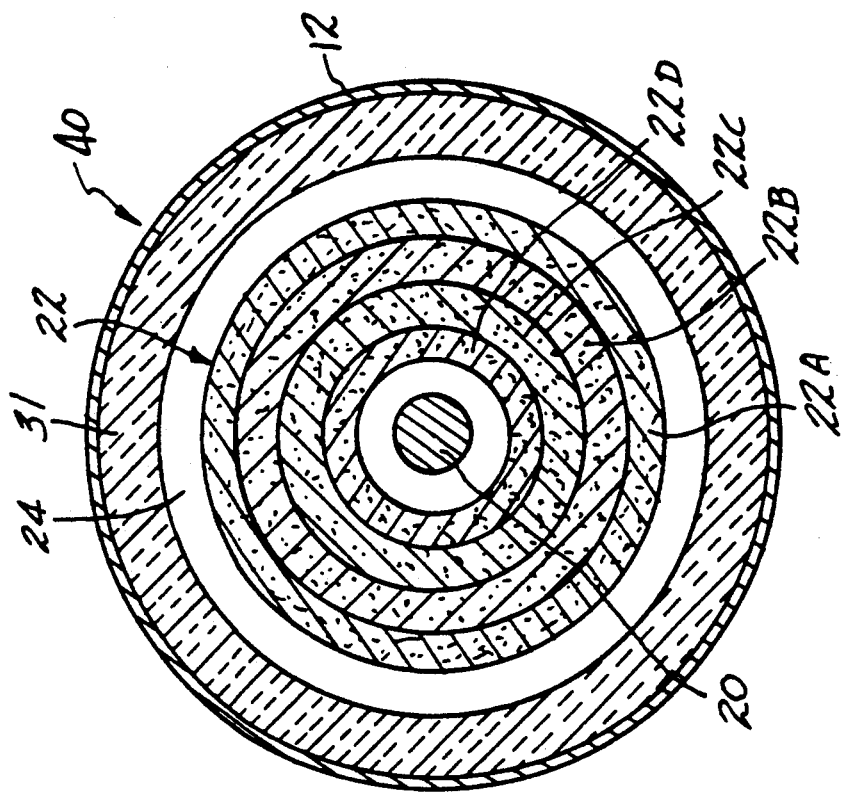
FIG. 4 is a sectional view taken on the line 4—4 in FIG. 3.
Figure 3:
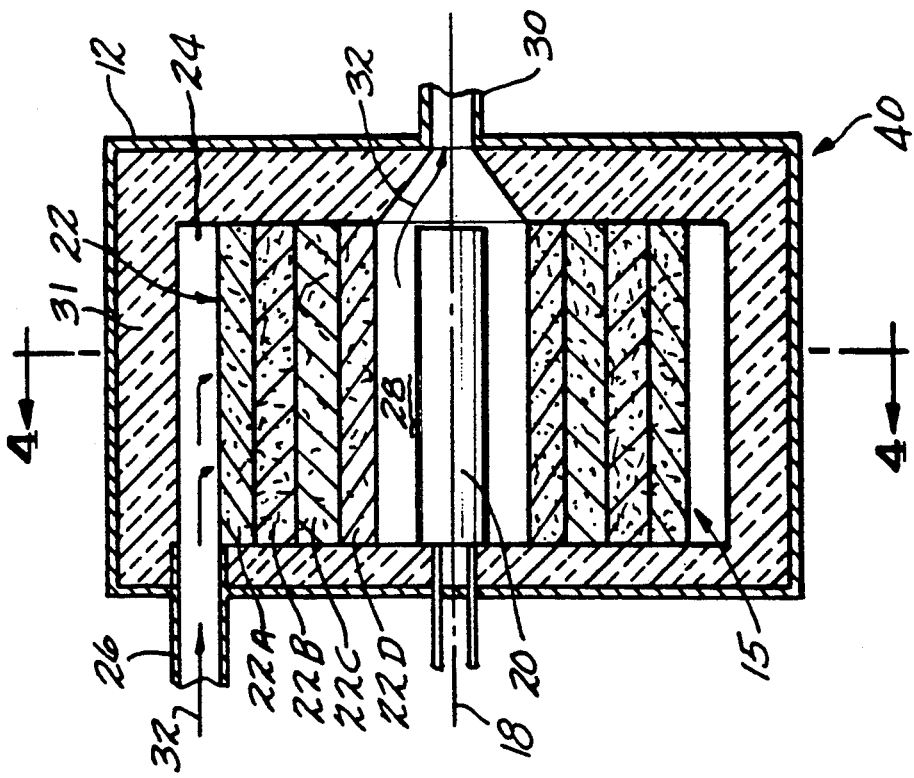
FIG. 3 is a longitudinal sectional view through a second preferred embodiment of the present invention.

The porous medium may be designed to have radially variable permeability. For example, porous medium 22 may have a permeability which is a decreasing function of the ring radius as in the second embodiment shown in FIGS. 3 and 4.

The vaporizer 40 comprises a cylindrical canister having an outer wall 12 and defining therein a vaporizing chamber 15 as in the previous embodiment. A resistive heater 20 is centrally disposed along axis 18 in the center of the porous medium 22. The porous medium 22 is a tubular solid positioned in the chamber 15 so as to create an outer annular liquid feed channel 24 and a central axial vapor header 28 around the heater 20 as in the previous embodiment. An inlet tube 26 feeds propellant 32 into the feed channel 24 and an exhaust tube 30 directs the propellant vapor 32 from the vapor header 28 to the thruster (not shown). A layer 31 of insulation separates the vaporizing chamber 15 from the outer wall 12 as in the first embodiment.

In this second preferred embodiment, porous medium 22 is a structurally solid annular cylinder made up of a plurality of concentric annular portions 22a, 22B, 22C, and 22D and thus walls 14 and 16 are not needed. The outer portion 22A has a lower permeability than the inner portions 22B, 22C, and 22D with inner portion 22D having the highest permeability.

In this embodiment, the outer portion 22A acts primarily as a liquid flow restrictor and the transition zone 38 may range radially over all four portions depending on the current input to the heater. This arrangement can provide very fine flow control. In another variation of this embodiment, medium 22 could be a single solid body having a radially varying porosity. Thus, the outer portion of the ring would have a relatively low permeability. Conversely, the inner portion of the ring, within which the vapor/liquid transition zone would range, would have a much higher permeability. This would also allow even finer control of mass flow rate.

Figure 6:
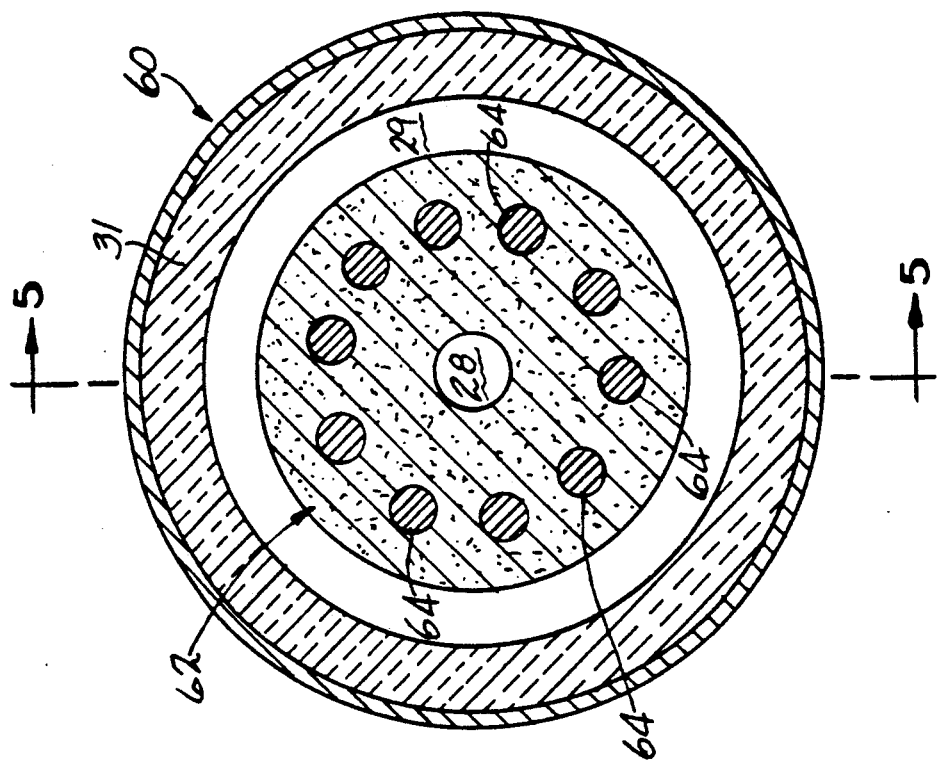
FIG. 6 is sectional view taken on the line 6—6 in FIG. 5.
Figure 5:
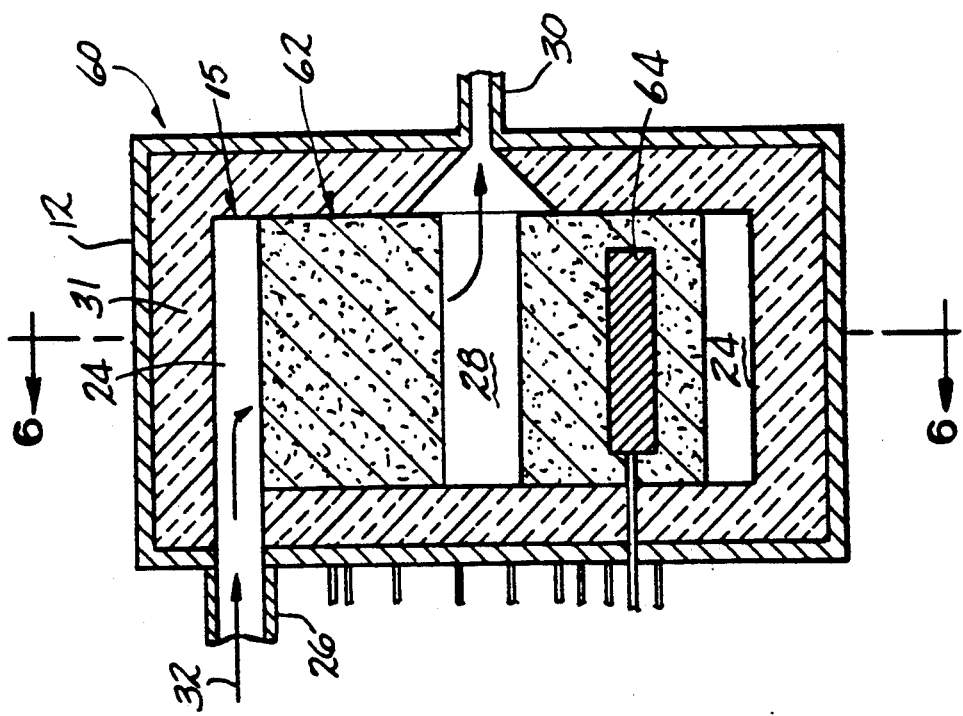
FIG. 5 is a longitudinal sectional view through a third preferred embodiment of the present invention.

A third preferred embodiment of the present invention is illustrated schematically in FIGS. 5 and 6. The vaporizer 60 again comprises a cylindrical canister having an outer wall 12 and defining therein a vaporizing chamber 15 as in the previous embodiment. The porous medium 62 is a tubular solid positioned in the chamber 15 so as to create an outer annular liquid feed channel 24 and a central axial vapor header 28 as in the previous embodiment. An inlet tube 26 feeds propellant 32 into the feed channel 24 and an exhaust tube 30 directs the propellant 32 from the vapor header 28 to the thruster (not shown). A layer 31 of insulation separates the vaporizing chamber 15 from the outer wall 12 as in the first embodiment.

However, in this embodiment, the heater is not centrally located in the vapor header, but is made up of multiple heater elements 64 embedded in the porous medium 62 and radially spaced about the vapor header 28. In this embodiment the propellant 32, or other liquid to be throttled or vaporized, is not necessarily entirely vaporized in the chamber 15. The arrangement of heaters embedded within the medium 22 permits selective energization of individual heaters 64 to create localized vapor pockets in the adjacent porous medium 62 which produces a variable back pressure against the flow of fluid through the medium 62. In this manner the overall flow rate through the vaporizer 60 can be controlled without necessarily converting the exiting fluid 32 to a vapor.

Figure 7:
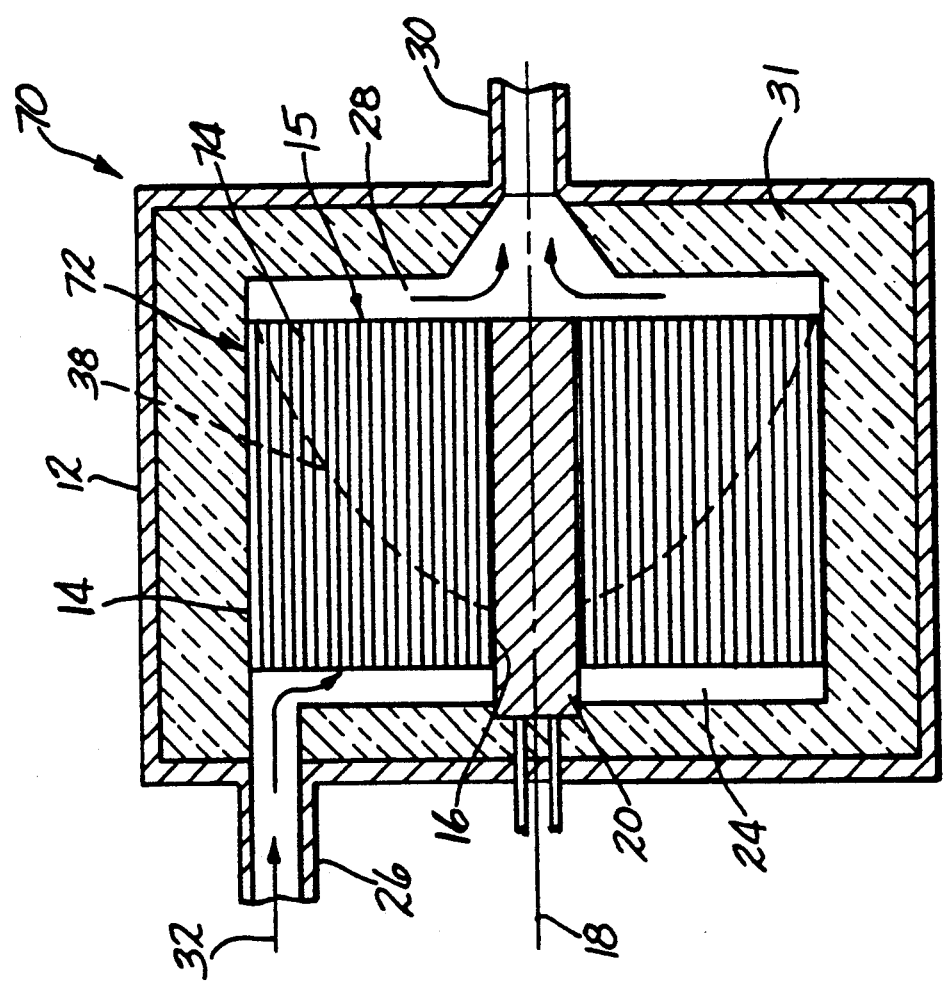
FIG. 7 is a longitudinal sectional view through a fourth preferred embodiment of the present invention.

A fourth preferred embodiment of the vaporizer in accordance with the present invention is shown in FIG. 7. The vaporizer 70 includes a cylindrical canister body 12 defining a vaporizing chamber 15 therein as in the first and second embodiments. A resistive heater 20 is centrally disposed along axis 18 in the center of the vaporizing chamber 15. The tubular solid medium 72 is positioned in the chamber 15 so as to create disk shaped liquid inlet feed channel 24 at one end of the medium 72 and a disk shaped vapor header 28 at the other end of the tubular medium. An inlet tube 26 feeds a propellant fluid in direction 32 into the feed channel 24 and an exhaust tube 30 directs the propellant vapor from the vapor header 28 to the thruster (not shown). A layer 31 of insulation separates the vaporizing chamber 15 from the outer wall 12 as in the first embodiment.

However, in this embodiment, the medium 72 is made up of a bundle arrangement or bed of generally axially aligned capillary tubes 74 around the heater 20. The bundle of capillaries 74 functions the same as the porous medium of the previous embodiments. The radii of the tubes 74 are sufficiently small so as to ensure that surface forces dominate in the force balance and thus good thermal contact is provided between the capillary tube walls and the fluid propellant. The amount of heat produced by the heater 20 determines the location of the liquid/vapor transition zone 38 within the capillary tube medium 72 and thus the back pressure against the flow of fluid through the vaporizer.

In any of these embodiments, non-cylindrical geometries could alternatively be utilized. Proper placement of heaters for example, embedded within the medium, as in FIGS. 5 and 6, to control the vapor phase flow resistance would allow application of the basic idea in a variety of configurations or geometries. For example, radially outward rather than inward flow in a cylindrical geometry might offer some fluid dynamic advantages. The fundamental approach is also applicable in axial and spherical geometries, as well.

Other variations could include the utilization of multiple heaters as in FIGS. 5 and 6 embedded in or positioned adjacent the porous or capillary tube bed in these different geometries. The heater means could also be positioned around the outside radius of the vaporizing chamber and the propellant inlet along the central axis. The fluid flow direction in such an apparatus would be radially outward, with the vapor header positioned to collect exiting vapor around the outer surface of the vaporizing porous medium.

The overall shape may be spherical or any other shape depending on the energy balance requirements or overall system requirements. The controlled regional vapor pocket approach could be utilized to reduce drastically the mass flow rate through portions of a packed, porous, or tubular capillary bed without altering the phase of the fluid exiting the device. Although stationary pockets of vapor phase would exist within such a device during steady state operation, the exit stream could in fact be liquid.

While the invention has been described above with reference to specific embodiments thereof, it is apparent that many changes, modifications and variations can be made without departing from the inventive concept disclosed herein. Accordingly, it is intended to embrace all such changes, modifications and variations that fall within the spirit and broad scope of the appended claims. All patent applications, patents and other publications cited herein are incorporated by reference in their entirety.

What is claimed is:

1. A method of controlling a flow of a fluid comprising the steps of:
    a) passing a liquid phase of said fluid into a porous medium;
    b) producing a liquid/vapor transition zone within said medium so as to create a back pressure against flow of fluid through said medium;
    c) providing an electrical heating means coacting with said medium for controllably raising the temperature of said fluid in said medium; and
    d) controlling the position of said zone in said medium by controlling the power into said heating means; and
    e) allowing said fluid to exit said medium.

2. A method of controlling a flow of a fluid comprising the steps of:
    a) passing a liquid phase of said fluid into a porous medium;
    b) producing a liquid/vapor transition zone within said medium so as to create a back pressure against flow of fluid through said medium;
    c) controlling the size of said zone to vary the back pressure; and
    d) allowing said fluid to exit said medium.

3. A method of controlling a flow of a fluid comprising the steps of:
    a) passing a liquid phase of said fluid into a porous medium;
    b) producing a liquid/vapor transition zone within said medium so as to create a back pressure against flow of fluid through said medium;
    c) controlling the location of said zone to vary the back pressure; and
    d) allowing said fluid to exit said medium.

* * * * *

UNITED STATES PATENT AND TRADEMARK OFFICE
CERTIFICATE OF CORRECTION

PATENT NO. : 5,267,584

DATED : December 7, 1993

INVENTOR(S) : Richard D. Smith

It is certified that error appears in the above—identified patent and that said Letters Patent is hereby corrected as shown below:

On title page, item [73] add --Olin Corporation, Cheshire, Connecticut.--

Add "Attorney, Agent, of Firm" --Bruce E. Burdick--

Signed and Sealed this

Third Day of May, 1994

Attest:

BRUCE LEHMAN

Attesting Officer    Commissioner of Patents and Trademarks